United States Patent [19]
Loebig

[11] Patent Number: 5,268,909
[45] Date of Patent: Dec. 7, 1993

[54] METHOD FOR REDUCING BIT ERRORS IN DIGITAL COMMUNICATION SYSTEMS

[75] Inventor: Norbert Loebig, Darmstadt, Fed. Rep. of Germany

[73] Assignee: Siemens Aktiengesellschaft, Munich, Fed. Rep. of Germany

[21] Appl. No.: 918,079

[22] Filed: Jul. 24, 1992

[30] Foreign Application Priority Data

Aug. 27, 1991 [DE] Fed. Rep. of Germany ....... 4128412

[51] Int. Cl.$^5$ ................ G06F 11/10; H03M 13/00; H03M 13/02
[52] U.S. Cl. .................... 371/49.1; 371/48; 370/14; 370/13
[58] Field of Search ............. 371/49.1, 48; 370/14, 370/13, 63, 60

[56] References Cited

U.S. PATENT DOCUMENTS

| | | | |
|---|---|---|---|
| 4,197,523 | 4/1980 | Philip et al. | 370/59 |
| 4,345,324 | 8/1982 | Smitt | 370/13 |
| 4,535,442 | 8/1985 | Maddern et al. | 370/13 |
| 4,821,256 | 4/1989 | Schmidt et al. | 371/49.1 |

FOREIGN PATENT DOCUMENTS

| | | |
|---|---|---|
| 2427668 | 1/1975 | Fed. Rep. of Germany . |
| 3513181 | 10/1986 | Fed. Rep. of Germany . |
| 3821871 | 1/1990 | Fed. Rep. of Germany . |
| 1447713 | 8/1992 | United Kingdom . |

*Primary Examiner*—Robert W. Beausoliel, Jr.
*Assistant Examiner*—Trinh Tu
*Attorney, Agent, or Firm*—Hill, Steadman & Simpson

[57] ABSTRACT

Method for reducing bit errors in digital communication systems. Bit falsifications can occur in the through-connection of bit streams composed of a plurality of information words in the switching networks of digital communication systems. Correcting these bit errors presents problems in practice. Given redundantly executed, respectively activated switching network halves, only the correctly through-connected information word is forwarded to the terminal subscriber after the through-connection. Whether an information word was correctly through-connected is identified after the through-connection with a combined parity bit check and a bit-by-bit comparison of information words that are through-connected in parallel.

5 Claims, 2 Drawing Sheets

FIG 3

|   | $P^{(0)}$ | $P^{(1)}$ | $I^{(0)}$ | $I^{(1)}$ | OUT |
|---|---|---|---|---|---|
| 1  | $P_C$ | $P_C$ | E  | | $f(S)$ |
| 2  | $P_I$ | $P_I$ | E  | | $f(S)$ |
| 3a | $P_C$ | $P_I$ | E  | | $f(S)$ |
| 3b | $P_I$ | $P_C$ | E  | | $f(S)$ |
| 4a | $P_C$ | $P_I$ | NE | | (1) |
| 4b | $P_I$ | $P_C$ | NE | | (2) |
| 5  | $P_I$ | $P_I$ | NE | | $f(S)$ |
| 6  | $P_C$ | $P_C$ | NE | | $f(S)$ | ent
METHOD FOR REDUCING BIT ERRORS IN DIGITAL COMMUNICATION SYSTEMS

BACKGROUND OF THE INVENTION

The analog and digital transmission methods used for data transmission on line and cables are exposed to disturbing influences, for example, electromagnetic fields, that modify the information to be transmitted. For example, one or more bits can be "turned around" during the transmission. Since international long-distance connections are especially susceptible to bit errors, international standardization committees (such as, for example, CCITT) have defined minimal rules for bit error rates. Optical transmission links are considerably less subject to external influences, so that the transmission reliability is extremely high in optical transmission links.

Every transmission link is generally composed of a total of two parts:

One part relates to the transmission of the information via a physical link between two nodes. These links are being increasingly realized with optical communications cables.

Another part relates to the through-connection of the information in the respective nodes wherein communication systems are installed.

As a result of the employment of optical transmission systems, the potential noise influence has been decisively reduced in the transmission-oriented part. By comparison thereto, bit errors frequently occur during the throughconnection events in the switching networks of the communication systems.

Due to their central significance for the communication systems, the switching networks are usually executed in duplicate or in triplicate configurations. This makes it possible to through-connect the bit stream via a different switching network level given malfunction of a switching network level. This is particularly true for errors that lead to a total outage of a switching network level.

However, bit falsifications caused by aging of individual component parts, for example, are problematical during the through-connection of a bit stream. Such errors are difficult to analyze and eliminate since they have no influence on the function of the switching network as a switching unit.

Error recognition methods for recognizing and correcting bit errors in switching networks are realized, for example, in the form of an ongoing supervision. German Published Application 24 27 668 discloses such a method. Therein, an additional parity bit is attached to the information words per channel that form the information before the actual through-connection event in the switching network, whereby an information word is usually composed of 8 bits. What is generally understood by a parity bit is the binary check sum across the individual bits of the corresponding information word. After the through-connection event, a binary check sum of the through-connection word is again calculated and compared to the transmitted parity bit. When the transmitted parity bit and the newly calculated parity bit deviate from one another, then there is a transmission error that is stored in a corresponding table memory. Statements about the condition of the corresponding switching network levels can thus be made over certain time spans. These statements are of a statistical nature and the switching network level that had the lowest bit error rate in the past can thus be preferably employed for the through-connection of the bit streams.

What is problematical in this method, however, is that the falsification of an even number of bits of an information word is not recognized as a bit error since the parity formation implemented at the output side leads to the same result as the parity formation that ensued at the input side. Further, although statistical statements abut the quality of the through-connection of the information words can be made for recognized bit errors, the bit error remains uncorrected and is thus forwarded to the terminal subscriber. This procedure harbors the risk that additional bit errors will add up in further network nodes.

SUMMARY OF THE INVENTION

It is an object of the present invention to keep the influence of bit errors in the switching networks of digital communication systems as low as possible in that the corrected information words are at least usually through-connected to the terminal subscriber.

The method of the present invention is for reducing bit errors in digital communication systems having a switching network composed of two switching network levels that is integrated into a communication network via interface elements. The interface elements contain first elements that provide the information words arriving via the communication network. The information words are composed of a plurality of bits with respective check information before the throughconnect event. The check information is formed via the bits of the information words and is composed of at least one bit. The interface elements also contain second elements that, after the through-connect event, again form the check information composed of at least one bit via the bits of the throuqh-connected information words and compare the result to the co-transmitted check information, and an evaluation procedure is provided that acquires statistical data about the quality of the through-connection from a check information evaluation. In the method the first elements provide the incoming information word with check information that is the result of a check information evaluation and that is composed of at least one bit, divide the incoming information word mirror-inverted into two information words that are forwarded via respective switching network levels. The second elements subject each of the through-connected information words to another check information evaluation and compare them to one another bit-by-bit, and given non-coincidence of the information words, forward that information word that is consistent with respect to its co-transmitted check information to the terminal subscriber or, given nonsatisfaction of this condition, forward that information word that was conducted across the switching network level having the better statistical quality data to the terminal subscriber. The check information can be the parity of the information word.

In an arrangement for the implementation of the method of the present invention the first elements are logic elements that are composed of first memory elements, control modules and distributor modules. The second elements are second logic elements that are composed of second memory elements, comparator elements, control elements, and multiplex elements. The first logic elements as well as the second logic elements can be ASIC modules.

An important feature of the present invention is the doubling of the information words as well as the subsequent through-connection that is implemented in parallel, via two respectivel activated switching network levels. This not only enables an interpretation of the parity bits at the output side of each and every through-connected information word, but also enables a bit-by-bit comparison of both information words. Such a combined check usually permits unambiguous conclusions about bit errors that may have occurred and allows the correctly through-connected information word to be forwarded to the terminal subscriber. An extremely low error rate is thus achieved in the network nodes, a situation that is especially relevant between network nodes connected by optical transmission links.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. in which like reference numerals identify like elements, and in which:

FIG. 3 is a chart depicting all possible combinations of bit errors.

DESCRIPTION OF THE PREFERRED EMBODIMENT

Figure 1:
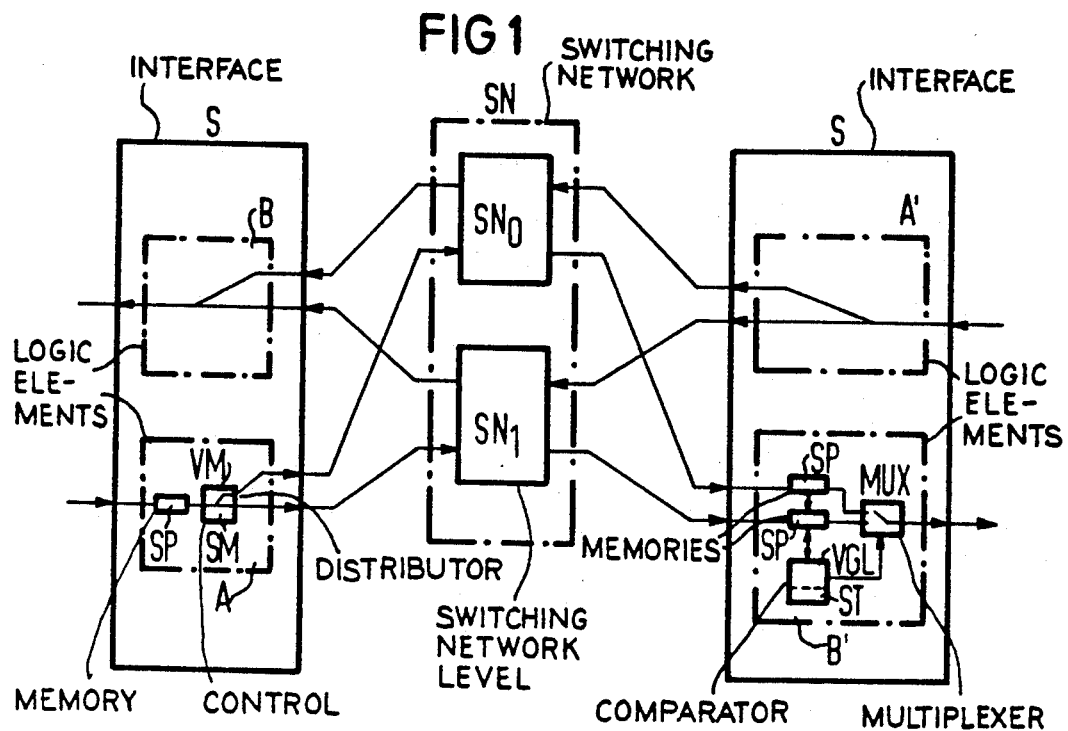
FIG. 1 is a block diagram of a digital communication system having a switching network for implementing the method of the present invention.

FIG. 1 depiots a switching network SN of a digital communication system KS. The switching network SN is redundantly fashioned. Both switching network levels $SN_0$, $SN_1$, are thereby connected to the communication network N via interface elements S. The interface elements S contain the logic elements A, A' as well as the logic elements B, B'.

The logical elements A, A' contain memory elements SP, distributor modules VM and control modules SM. An information word incoming via the communication network N that should have 8 bits in the exemplary embodiment is briefly and intermediately stored in the memory elements SP. The formation of the parity bit occurs here. Subsequently, the information word together with the parity bit is divided via the distributor modules VM onto the switching network levels $SN_0$, $SN_1$. This procedure is controlled and monitored by the control modules SM.

After the through-connect event via the respective switching network level $SN_0$, $SN_1$, the through-connected information words are examined in the logic elements B, B' for bit errors that may have occurred during the through-connect event. For this purpose, the logic elements B, B' contain memory elements SP, comparator elements VGL, control elements ST as well as multiplex elements MUX. The memory elements SP each implement a brief-duration intermediate storage of the through-connected information words; the formation of the difference between the two through-connected information words subsequently occurs bit-by-bit with the comparator elements VGL, as does another parity formation of the two information words; these are compared to the parity bit formed before the through-connect event and co-transmitted.

Thus, for recognizing bit errors the information words are not only compared to one another bit-by-bit, but a parity test of the two information words is also implemented at the output side. The result of these evaluations is retained by statistical evaluation procedures f(S). Statistical statements about the quality of the through-connection via the respective switching network level $SN_0$, $SN_1$ can thus be made at a later point in time.

When the information words conducted across the switching network levels $SN_0$, $SN_1$ are different and when one information word is consistent in view of its parity bit, then that information word is forwarded in the direction toward the terminal subscriber. In all other instances, the forwarding of one of the two information words is dependent on the evaluation procedures f(S).

The evaluation procedures f(S) take particular effect when, given application of the method of the present invention (i.e., output-side parity evaluation in combination with a bit-by-bit formation of differences) an unambiguous identification is not possible of the word that has bit errors. The evaluation procedures f(S) keep statistical data about the quality of the through-connect events of both switching network levels. This statistical data is updated in the case of recognized and unambiguously allocatable bit errors. Thus, in case of doubt the information word is forwarded in the direction toward the terminal subscriber via the switching network level that had the lowest bit error rate in the past. It is assumed in the exemplary embodiment illustrated in FIG. 2 that an error occurred in the transmission of bit 4 of the information word 2. According to the method of the present invention the information word 1 is forwarded since this has parity consistency. The table shown in FIG. 3 shows a case study of the method of the present invention. All possible combinations of a bit falsification are covered here. When, for example, the bits of the information word $I^{(0)}$ (i.e., of the information word that was conducted across the switching network level 0) coincides with the bits of the information word $I^{(1)}$ (i.e., of the information word that was conducted across the switching network level 1) and when the statuses of the parity bits $P^{(0)}$, $P^{(1)}$ of the two information words $I^{(0)}$, $I^{(1)}$ are simultaneously inconsistent with respect to the parity information, then the statistical evaluation functions f(S) must decide which of the two information words is through-connected to the terminal subscriber since an unambiguous statement regarding which bit was falsified in the through-connection is not possible in this case. In FIG. 3 the notation "E" indicates that the bits of the information word $I^{(0)}$ coincide with the bits of the information word $I^{(1)}$, wherein the notation "NE" indicates that they are not consistent.

Figure 2:
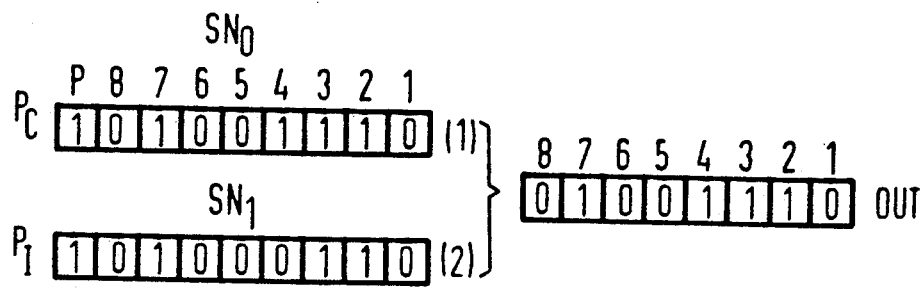
FIG. 2 depicts an example of the occurrence of a bit error in a transmitted information word.

The example of a falsification of bit 4 of the information word $I^{(1)}$ treated in FIG. 2 may be seen in the table under 4a. Unambiguous statements about the falsified bit are possible here and consequently, the information word $I^{(1)}$ is forwarded to the terminal subscriber.

An especially advantageous development of the present invention is that the logic elements A, A', B, B' can be implemented in a large scale integration (LSI) module, what is referred to as an ASIC module.

Such modules are presently already versatilely employed. Further, the employment of such modules assures that the delay times arising in the storage of the information words can be minimized and can be neglected in terms of practical considerations.

Th invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for reducing bit errors in digital communication systems having a switching network, composed of at least two switching network levels, that is integrated into a communication network via interface elements, each interface element having
    a first element that provides information words arriving via the communication network, each information word being composed of a plurality of bits with respective check information before a through-connect event in the switching network, said check information being formed via the bits of the information words and being composed of at least one bit, and
    a second element that, after the through-connect event, again forms check information, that is composed of at least one bit, and
    a second element that, after the through-connect event, again forms check information, that is composed of at least one bit, via the bits of the through-connected information words and compares the result to respective co-transmitted check information, and
    an evaluation procedure that acquires statistical data about the quality of through-connections of information words from an evaluation of respective check information, comprising the steps of:
        in the first element providing an incoming information word with check information that is a resultof a check information evaluation, and dividing said incoming information word into at least two identical information words and forwarding the two infomation words via respective switching network levels, said check information being composed of at least one bit; and
        in the second element subjecting each of the through-connected information words to another check information evaluation and comparing one through-connected information word to another bit-by-bit, and
        given a non-valid comparison of the through-connected information words, providing to a terminal subscriber that information word that is consistent with respect to a cotransmitted check information thereof or, given a valid comparison of the through-connected information words, forwarding to the terminal subscriber that information word, that was through-connected across the switching network level, having better statistical quality data than the other information word.

2. The method according to claim 1, wherein check information is a parity of an information word.

3. An arrangement for reducing bit errors in digital communication systems having a switching network, composed of at least two switching network levels, that is integrated into a communication network via interface elements, each interface element having
    a first element that provides information words which arrive via the communication network and compose of a plurality of bits with respective check information before the through-connect event in the switching network, said check information being formed via the bits of the information words and being composed of at least one bit, and
    a second element that, after the through-connect event, again forms check information, which is composed of at least one bit, via the bits of the through-connected information words and compares the formed check information to respective co-transmitted check information of the first element, and
    an evaluation procedure that acquires statistical data about the quality of through-connections of information words from an evaluation of respective check information;
    wherein in the first element an incoming information word is provided with check information that is a result of a check information evaluation and that is composed of at least one bit, and said incoming information word is divided into at least two identical information words and the two information words are forwarded via respective switching network levels;
    wherein in the second element each of the through-connected information words is subjected to another check information evaluation and the through-connected information words are compared to each other bit-by-bit; and
    given a non-valid comparison of the through-connected information words, a terminal subscriber is provided that information word that is consistent with respect to a cotransmitted check information thereof or, given a valid comparison of the through-connected information words the terminal subscriber is forwarded that information word, that was through-connected across the switching network level, having better statistical quality data than the other information word, comprising:
        the first element being a first logic element having a first memory element for storing an incoming information word, a distributor module connected to said first memory element for dividing the information word into two identical information words and for sending the identical information words and the respective check information to the at least two switching network levels, and a control module for controlling said first memory element and said distributor module; and
        the second element being a second logic element having second memory elements for receiving the through-connected information words, a comparator element connected to said second memory elements for comparing one through-connected information word to another and for comparing check information received by the second element to check information formed by the second element for each through-connected information word, and a multiplex element connected to said second memory elements for sending a selected through-connected information word to the terminal subscriber, and a control element for controlling said second memory elements, said comparator element and said multiplex element.

4. The arrangement according to claim 3, wherein the first logic element and the second logic element are large scale integration modules.

5. A method for redcing bit errors in digital communication systems having a switch network, composed of at least two switching network levels, that is integrated into a communication network via interface elements, comprising the steps of:

providing for each interface element a first element that provides information words arriving via the communication network, the information words being composed of a plurality of bits with respective check information before a through-connect event in the switching network;

in the first element providing an incoming information word with check information that is a result of a check information evaluation and that is composed of at least one bit and formed from bits of a respective information word and dividing said incoming information word into at least two identical information words and forwarding the two information words via respective switching network levels;

providing for each interface element a second element that, after the through-connect event, again forms check information, that is composed of at least one bit, via the bits of the respective through-connected information words and that compares the results to a respective co-transmitted check information;

in the second element comparing one through-connected information word to anothe bit-by-bit;

providing an evaluation procecure that acquires statistical data about the quality of the through-connections of the information words from an evaluation of the check information; and given a non-valid comparison of the through-connected information words, providing to a terminal subscriber that information word that is consistent with respect to a cotransmitted check information thereof or, given a valid comparison of the through-connected information words, forwarding to the terminal subscriber that information word that was through-connected across the switching network level having better statistical quality data than the other information word, check information being a parity of a respective information word.

* * * * *